Figure 1:
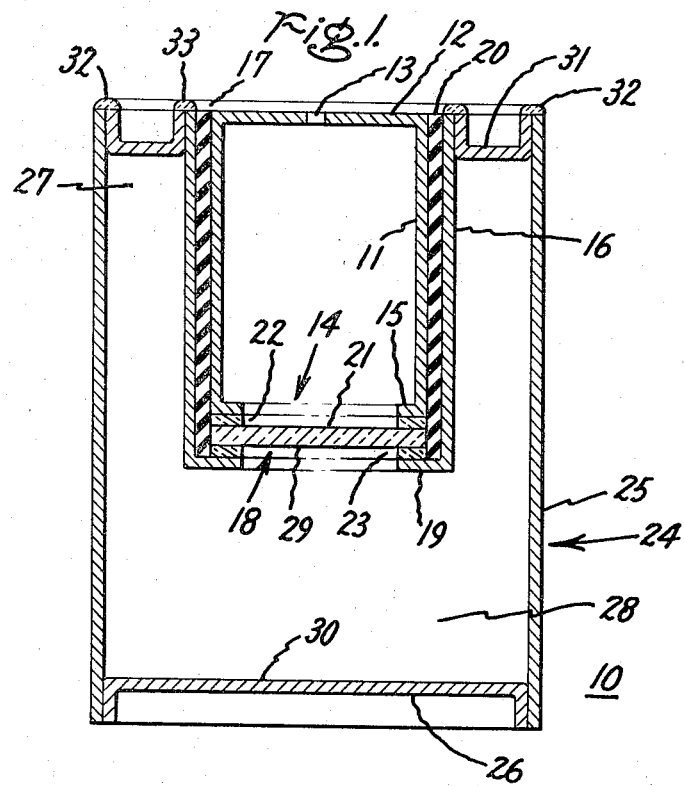

United States Patent [19]
Dubin

[11] 3,852,114
[45] Dec. 3, 1974

[54] CELL CASING AND HERMETICALLY SEALED PRIMARY SODIUM-SULFUR CELL

[75] Inventor: Robert R. Dubin, Schenectady, N.Y.

[73] Assignee: General Electric Company, Schenectady, N.Y.

[22] Filed: Dec. 28, 1973

[21] Appl. No.: 429,375

[52] U.S. Cl. ............ 136/83 T, 136/100 R, 136/166
[51] Int. Cl. ...................... H01m 21/14, H01m 1/00
[58] Field of Search............. 136/6 FS, 6 R, 6 F, 20, 136/83 R, 83 T, 100 R, 166; 206/2, 84; 220/9, 10, 68

[56] References Cited
UNITED STATES PATENTS

| | | | |
|---|---|---|---|
| 3,404,035 | 10/1968 | Kummer et al. | 136/6 FS |
| 3,404,036 | 10/1968 | Kummer et al. | 136/83 R X |
| 3,424,622 | 1/1969 | Dechert | 136/161 |
| 3,554,806 | 1/1971 | Greenberg et al. | 136/6 FS |
| 3,756,856 | 9/1973 | Tennenhouse | 136/6 FS |

*Primary Examiner*—Anthony Skapars
*Attorney, Agent, or Firm*—Paul R. Webb, II; Joseph T. Cohen; Jerome C. Squillaro

[57] ABSTRACT

A cell casing and a hermetically sealed primary sodium-sulfur cell are disclosed wherein the metallic cell casing includes two sealed inner metallic casings with electrical insulation therebetween and a solid sodium ion-conductive material disc affixed at one end of both inner casings, an outer metallic casing surrounding the inner casings and affixed to the outermost inner casing at one end, and the outer casing defining a chamber between the disc and a removable end for the outer casing. A hermetically sealed primary sodium-sulfur cell has the above type of casing with a sodium anode within the inner casings or the outer casing and a cathode of a sulfur and sodium polysulfide in conductive material within the other casing or casings.

4 Claims, 2 Drawing Figures

PATENTED DEC 3 1974

3,852,114 ived Oct. 1, 1968 under the title "Energy Conversion
CELL CASING AND HERMETICALLY SEALED PRIMARY SODIUM-SULFUR CELL This invention relates to cell casings and to hermetically sealed primary cells and, more particularly, to such cell casings and to hermetically sealed primary sodium-sulfur cells.

Sodium-sulfur cells, which operate at elevated temperatures, are known in the prior art as, for example, described in Kummer et al., U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

My present invention is directed to providing an improved cell casing and an improved hermetically sealed primary sodium-sulfur cell.

The primary objects of our invention are to provide a rugged, metallic cell casing adapted for close packing of cells in a battery and a hermetically sealed primary sodium-sulfur cell which exhibits constant current density during discharge.

In accordance with one aspect of my invention, a cell casing includes two sealed inner casings with electrical insulation therebetween and a solid sodium ion-conductive material disc affixed at one end of both inner casings, an outer metallic casing surrounding the inner casings and affixed to the outermost inner casing at one end, and the outer casing defining a chamber between the disc and a removable end for the outer casing.

Figure 2:
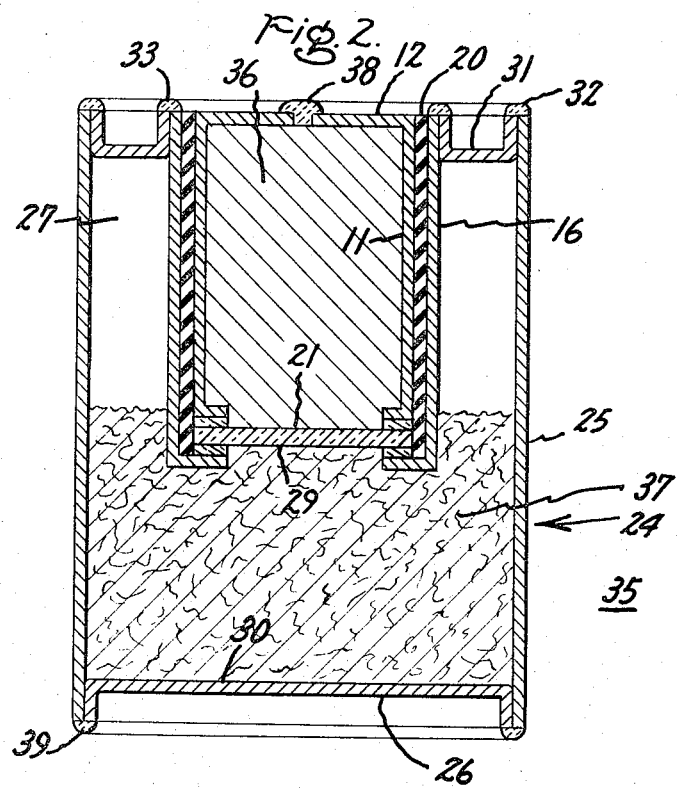

These and various other objects, features and advantages of the invention will be better understood from the following description taken in connection with the accompanying drawing in which:

FIG. 1 is a sectional view of a cell casing made in accordance with my invention; and FIG. 2 is a sectional view of a hermetically sealed primary sodium-sulfur cell made in accordance with my invention.

In FIG. 1 of the drawing, there is shown generally at 10 a cell casing embodying my invention which has a first inner metallic casing 11 with a closed end 12, a fill opening 13, and an opposite open end 14, and a first inwardly extending metallic flange 15 affixed to open end 14 of first inner casing 11. A second inner metallic casing 16 with opposite open ends 17 and 18 surround first inner casing 11 and is spaced therefrom. A second inwardly extending metallic flange 19 is affixed at one open end 18 of second inner casing 16 adjacent to first flange 15 and spaced therefrom. A layer 20 of electrical insulation is positioned between two inner casings 11 and 16, and fills the space therebetween. A solid sodium ion-conductive material disc 21 is positioned between adjacent flanges 15 and 19 of casings 11 and 16. Low temperature melting glass seals 22 and 23 seal adjacent flanges 15 and 19 to disc 21 at its periphery. An outer metallic casing 24 comprises a side wall 25, a removable closed end 26 and an opposite open end 27. Side wall 25 of outer casing 24 surrounds at least partially inner casings 11 and 16. Side wall 25 of outer casing 24 extends beyond flange 19 of second inner vessel 16 thereby providing a chamber 28 between one surface 29 of disc 21 and interior surface 30 of removable end 26 of outer casing 24. Outer casing 24 is also spaced from second inner casing 16 defining a continuation of chamber 28. An annular ring 31 is affixed to outer casing 24 as by welding at 32 and as by welding at 33 to second inner casing 16 at open end 27 of outer casing 24 thereby closing open end 27 of outer casing 24.

In FIG. 2 of the drawing there was shown an electrically sealed primary sodium-sulfur cell 35 embodying my invention, which cell includes the above described cell casing 10 shown in FIG. 1. An anode 36 is positioned preferably within inner casing 11 of the inner casings. Anode 36 is sodium metal. A cathode 37 of sulfur and sodium polysulfide in a conductive material is positioned preferably within outer casing 24 and is in contact with surface 29 of disc 21 and with the interior surface of outer casing 24. Fill opening 13 enclosing end 12 of first inner casing 11 is shown closed in any suitable manner such as by a weld 38. Closed end 26 is affixed to side wall 25 of outer casing 24 as by welding at 39. The resulting structure is an hermetically sealed primary sodium-sulfur cell.

I found that I could form a cell casing by providing a first inner metallic casing with a closed end, a fill opening, and an opposite open end, which opposite open end has an inwardly extending metallic flange attached thereto. A second inner metallic casing with opposite open ends is positioned around the first inner casing to surround the inner casing and to be spaced therefrom. A second inner casing has an inwardly extending metallic flange attached to one open end thereof, which flange is adjacent to the flange of the first inner casing and spaced therefrom. A solid sodium ion-conductive material disc is positioned between the adjacent flanges of the inner casings. Low temperature melting glass is provided in the form of a pair of washers which are positioned between each opposite side of the disc and the associated flange. The glass washers which melt in a low temperature are made of a suitable sodium and sulfur resistant glass such as Corning glass No. 7056, General Electric Company glass No. 1013, Sovirel glass No. 747 or Kimble glass No. N–51A. The above assembly is then heated in a furnace whereby the glass washers are heated to a temperature of 1,000° C. In this manner the glass seals together the adjacent flanges to the disc at its periphery.

An outer metallic casing which has a side wall, a removable closed end, and an opposite open end had its side wall positioned to surround at least partially the inner casings. The side wall of the outer casing extends beyond the flange of the second inner casing thereby providing a chamber between the exterior surface of the disc and the opposite end of the side wall into which the removable end fits. The side wall of the outer casing is spaced from the exterior wall of the second inner casing. A metallic annular ring is affixed to the outer casing at its open end, for example by welding. The second inner casing is then affixed at its open end to the same annular ring such as by welding thereby closing the open end of the outer casing. A layer of electrical insulation is positioned between the two inner casings and fills the space therebetween. Various types of electrical insulation including asbestos, woven glass fibers, etc. are suitable for use. The removable closed end is then positioned within the side wall of the outer casing to close the outer casing at its opposite end. The metal portions of the casing can be formed of tantalum or stainless steel. The casing which is adjacent to the sodium anode can also be formed of Kovar alloy. This structure results in a sealed casing made in accordance with my invention.

I found that I could form a hermetically sealed primary sodium-sulfur cell by employing the above-described cell casing. The anode, which consists of sodium metal is positioned preferably within the innermost casing of the inner casings. The cathode is positioned preferably within the outer metallic casing and is in contact with the exterior surface of the disc and with the interior of at least a portion of the outer casing. The inner casings are filled with sodium metal by filling the inner casings through the fill opening with molten sodium. The fill opening is then closed, for example by welding. In this manner there is a hermetically sealed anode reactant compartment for the cell. The cathode, which consists of sulfur and sodium polysulfide in a conductive material, is then positioned within the outer casing of the cell. This is accomplished, for example, by positioning a conductive material such as carbon felt within the outer casing. The outer casing is filled with carbon felt so that it contacts the exterior surface of the disc and extends to the initially open end of the outer casing. Molten sulfur and sodium polysulfide are then filled into the open end of the outer casing and allowed to solidify within the carbon felt thereby providing the cathode. The initial removable end or closure is positioned within the open end of the outer casing and affixed to the side wall of the outer casing by welding. This results in a hermetically sealed cathode compartment for the cell. The resulting structure is a hermetically sealed primary sodium sulfur cell. For operation of the cell an appropriate heating device (not shown) surrounds the cell to provide a necessary operating temperature of between 285°C and 400°C. Such a heating device can take various conventional forms such as a heating coil or a furnace. In the operation of the present sodium sulfur cell within its elevated operating temperature during its discharge half cycle sodium ions are passed into the sulfur reactant within the cathode compartment of the cell on the opposite side of the solid sodium ion-conductive material disc. When the sodium atoms are ionized, they release electrons which are carried from the anode compartment by an electric lead (not shown) to the cathode. In this manner electric energy is generated.

While a single cell casing and a single electrically sealed primary sodium-sulfur cell are described above, it will, of course, be appreciated that a plurality of these cells can be used to provide a useful battery. The unique configuration of my cell provides for close packing of such cells for use in a battery.

The unique advantages of my invention over the prior art, for example as shown in the above-identified Kummer et al. patent, is that my cell is hermetically sealed and provides a constant current density throughout the entire cell discharge. Further, with my improved cell the generated sodium polysulfide during discharge is free to flow within the chamber space between the inner casings and the outer casing without affecting the current density of the cell. This improved structure keeps a positive pressure of the sulfur compound on the exterior surface of the disc which is determined by the height of the sulfur compound in the outer casing chamber above the level of the disc. It will be further appreciated that various other means of filling the cell can be employed. It will be appreciated that for an elimination of trapped air between the sulfur or the sodium and the respective face of the disc that vacuum pumping may be required after filling it. While I prefer to fill the inner casings with sodium and position the cathode within the outer casing, the anode and cathode are interchangeable providing the conductive material is included in the cathode compartment.

Examples of cell casings or hermetically sealed primary sodium-sulfur cells made in accordance with my invention are set forth below.

EXAMPLE I

A battery casing is assembled as above-described and as shown in FIG. 1 by providing a first inner tantalum casing with a closed end, a fill opening and an opposite open end, which opposite open end had an inwardly extending tantalum flange attached thereto. A second inner tantalum casing with opposite open ends is positioned around the first casing thereby surrounding the inner casing and spaced therefrom. The second inner casing has an inwardly extending tantalum flange attached thereto at one open end. Both of these flanges are adjacent to one another and spaced apart. A layer of electrical insulation in the form of asbestos material is positioned between the two inner casings and filled the space therebetween. A solid sodium ion-conductive material disc is positioned between the adjacent flanges of the inner casings. Low temperature melting glass in the form of a pair of washers of Corning glass No. 7052 is positioned between each opposite side of the disc and the associated flange. This glass is both sodium and sulfur resistant. The assembly is then heated in a furnace whereby the temperature of the glass washers is raised to 1,000°C thereby providing glass seals which seals together the adjacent flanges to the disc at its periphery.

An outer tantalum casing with a side wall, and a removable closed end, has its side wall positioned to surround the inner casings, and has its open end on the same plane with the closed end of the first inner casing. The side wall of the outer casing extends lengthwise beyond the flange of the second inner casing thereby providing a chamber between the exterior surface of the disc and the opposite end of the side wall into which the removable closed end is attached to fit. In this manner the side of the outer casing is spaced from the exterior wall of the second inner casing. An annular tantalum ring is welded to the outer casing at its open end. The second inner casing is then welded at its open end to the same annular ring thereby closing the open end of the outer casing. The removable closed end is then sufficient within the side wall of the outer casing to close the outer casing at its opposite end. This structure results in a cell casing made in accordance with my invention.

EXAMPLE II

A hermetically sealed primary sodium-sulfur cell is assembled as above-described and as shown in FIG. 2. The cell casing is assembled as described above in Example I except that the removable closed end is not positioned within the side wall of the outer casing. The first inner casing is filled with sodium metal by filling the first inner casing through its fill opening with molten sodium. The fill opening is then closed by welding. In this manner there is a hermetically sealed anode reactant compartment for the cell. The cathode, which consists of sulfur and sodium polysulfide in a conductive material, is then formed within the outer casing of the cell. This is accomplished by positioning a conductive material of carbon felt within the outer casing and filling the outer casing from the exterior surface of the disc to the initially open end of the outer casing. Molten sulfur and sodium polysulfide is then poured into the open end of the outer casing and allowed to solidify within the carbon felt thereby providing the cathode.

The initially removable closed end is then positioned within the open end of the outer casing and sealed to the adjacent side wall of the outer casing by welding. The resulting structure is a hermetically sealed primary sodium-sulfur cell made in accordance with my invention.

While other modifications of the invention and variations thereof which may be employed within the scope of the invention have not been described, the invention is intended to include such as may be embraced within the following claims:

What I claim as new and desire to secure by Letters Patent of the United States is:

1. A battery casing comprising a first inner metallic casing with a closed end, a fill opening, and an opposite open end, a first inwardly extending metallic flange affixed to the open end of the first inner casing, a second inner metallic casing with opposite open ends, the second inner casing surrounding the first inner casing and spaced therefrom, a second inwardly extending metallic flange affixed to one open end of the second inner casing adjacent to the first flange and spaced therefrom, a layer of electrical insulation positioned between the two inner casings and filling the space therebetween, a solid sodium ion-conductive material disc positioned between the adjacent flanges of the inner casings, low temperature melting glass seals sealing the adjacent flanges to the disc at its periphery, an outer metallic casing comprising a side wall, a removable closed end, and an opposite open end, the side wall of the outer casing surrounding at least partially the inner casings, the side wall of the outer casing extending beyond the flange of the second inner vessel thereby providing a chamber between one surface of the disc and the interior surface of the removable end of the outer casing, the outer casing being spaced from the second inner casing, and a metallic annular ring affixed to the outer casing and the second inner casing at the open end of the outer casing thereby closing the open end of the outer casing.

2. A hermetically sealed primary sodium-sulfur cell comprising a first inner casing with a closed end and an opposite open end, a first inwardly extending flange affixed to the open end of the first inner casing, a second inner casing with opposite open ends, the second inner casing surrounding the first inner casing and spaced thereform, a second inwardly extending flange affixed to one open end of the second inner casing adjacent to the first flange and spaced therefrom a layer of electrical insulation positioned between the two inner casings and filling the space therebetween, a solid sodium ion-conductive material disc positioned between the adjacent flanges of the inner casings, low temperature melting glass seals sealing the adjacent flanges to the disc at its periphery, an outer metallic casing comprising a side wall, a closed end, and an opposite open end, the side wall of the outer casing surrounding at least partially the inner casings, the side wall of the outer casing extending beyond the flange of the second inner vessel thereby providing a chamber between one surface of the disc and the interior surface of the removable end of the outer casing, the outer casing being spaced from the second inner casing, an annular ring affixed to the outer casing and the second inner casing at the open end of the outer casing thereby closing the open end of the outer casing, a sodium anode within the first inner casing and in contact with the solid sodium ion-conductive material disc, and a cathode of sulfur and sodium polysulfide in a conductive material within the outer casing and in contact with the disc and with the outer casing.

3. A hermetically sealed primary sodium-sulfur cell as in claim 2, in which a cathode of sulfur and sodium polysulfide in a conductive material is within the first inner casing, and a sodium anode is within the outer casing and in contact with the disc and with the outer casing.

4. A hermetically sealed primary sodium-sulfur cell as in claim 2, in which metal casing portions are tantalum, and the conductive material of the cathode is carbon felt.

* * * * *